United States Patent
Kikukawa et al.

(10) Patent No.: US 6,780,112 B2
(45) Date of Patent: Aug. 24, 2004

(54) GAME DEVICE IN WHICH THE CHARACTER REPRESENTATION CHANGES CORRESPONDING TO THE VALUE OF A MULTI-LEVEL INPUT SIGNAL

(75) Inventors: Hideaki Kikukawa, Tokyo (JP); Hajime Saito, Saitama (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/792,277

(22) Filed: Feb. 22, 2001

(65) Prior Publication Data
US 2001/0023205 A1 Sep. 20, 2001

(30) Foreign Application Priority Data
Feb. 24, 2000 (JP) ........................................ 2000-048346

(51) Int. Cl.[7] .................................................. A63F 9/24
(52) U.S. Cl. ............................ 463/33; 463/36; 463/37
(58) Field of Search ............................... 463/38, 37, 33

(56) References Cited

U.S. PATENT DOCUMENTS

| | | | | |
|---|---|---|---|---|
| 6,102,802 A | * | 8/2000 | Armstrong | 463/37 |
| 6,283,857 B1 | * | 9/2001 | Miyamoto et al. | 463/31 |
| 6,306,036 B1 | * | 10/2001 | Burns et al. | 463/31 |

FOREIGN PATENT DOCUMENTS

| | | |
|---|---|---|
| EP | 0 867 212 A1 | 9/1998 |
| FR | 2 740 242 | 4/1997 |
| JP | 3040155 | 5/1997 |
| WO | 00/06270 | 2/2000 |
| WO | 00/64548 | 11/2000 |

* cited by examiner

Primary Examiner—Jessica Harrison
Assistant Examiner—Corbett B Coburn
(74) Attorney, Agent, or Firm—Katten Muchin Zavis Rosenman

(57) ABSTRACT

An entertainment device comprises: an operation device comprising a plurality of push operation mechanisms, each of which outputs a multi-level signal indicating one of three or more values, which change according to the amount of the push operation; a data hold section, which holds an image expression data to display one entertainment image by a different representation style by associating with an identification information of the corresponding representation style and an identification information of said push operation mechanism to which an input is scheduled, and a value of a multi-level signal; a detection section to detect a value of the identification information and the multi-level signal of said push operation mechanism input from said operation device; a data retrieval section, which specifies the identification information of the detected said push operation mechanism and the identification information of said representation style corresponding to the value of the multi-level signal and retrieves an image expression data corresponding to the identification information of the specified representation style from the data hold section; a display control section to change the representation style of a displayed entertainment image based on the retrieved image expression data; and a display section to display the entertainment image on a predetermined display unit. It is preferable that a value of said multi-level signal reversibly changes according to an amount of said push operation.

17 Claims, 12 Drawing Sheets

FIG. 8A

| IDENTIFICATION OF CONTROL BUTTON | OUTPUT LEVEL | FUNCTION IDENTIFICATION |
|---|---|---|
| OPERATION BUTTON 231(L2) | d<4f | FORWARD ASPECT |
| | d≧4f | SUBJECTIVE ASPECT |

| IDENTIFICATION OF CONTROL BUTTON | OUTPUT LEVEL | FUNCTION IDENTIFICATION |
|---|---|---|
| OPERATION BUTTON 231(L2) | d<4f | FORWARD ASPECT |
| | d≧4f | OBJECT IS LOCKED-IN |

| IDENTIFICATION OF CONTROL BUTTON | OUTPUT LEVEL | FUNCTION IDENTIFICATION |
|---|---|---|
| OPERATION BUTTON 221(O) | d<6f | WATCH OBJECT |
| | d≧6f | CHECK OBJECT |

| IDENTIFICATION OF CONTROL BUTTON | OUTPUT LEVEL | FUNCTION IDENTIFICATION |
|---|---|---|
| OPERATION BUTTON 221(×) | d<6f | CHARACTER RUNS |
| | d≧6f | CHARACTER JUMPS |

| IDENTIFICATION OF CONTROL BUTTON | OUTPUT LEVEL | FUNCTION IDENTIFICATION |
|---|---|---|
| OPERATION BUTTON 221(O) | d<2f | WEAK POWER ATTACK |
| | 2f≦d≦6f | MEDIUM POWER ATTACK |
| | d>6f | STRONG POWER ATTACK |

5-1
5-2
5-3

GAME DEVICE IN WHICH THE CHARACTER REPRESENTATION CHANGES CORRESPONDING TO THE VALUE OF A MULTI-LEVEL INPUT SIGNAL

BACKGROUND OF THE INVENTION

1. Field of the Invention

The present invention relates to an entertainment device such as a video game device, which produces the game, and a personal computer, which can execute a program for a game.

2. Description of the Related Art

In an entertainment device such as a video game device, it is general to be able to operate an entertainment image displayed on a display unit by using an operation device, which can be operated by an operation person with both hands. A plurality of operation buttons are provided on the operation device, and the operation person controls a representation style of the entertainment device by operating these operation buttons variously and diversely. Most of operation buttons are buttons each having a cross-shaped or a round-shaped direction indicating operation button and a plurality of multipurpose buttons as operation buttons. Predetermined binary signals are output from any one of these buttons by a push operation.

As described above, a function of a conventional entertainment device is formed on the assumption that the operation device is constructed with the direction indicating operation button and the multipurpose button. A signal output by the push operation of each of these operation buttons is either one of on or off signal. Therefore, the control mode of the display image displayed on the display unit becomes digital. Recently, an example that an analog input device, which is constructed by a track ball and a joystick, etc., is added to the operation device and the display pattern of the display image can be controlled in an analog fashion, can be seen. However, since such an analog input device is different from a digital input device such as the direction indicating operation button and multipurpose button in operativeness, it is inconvenience to operate according to the use of both of input devices.

On the other hand, it is well known that there is a tendency that a power, which pushes an operation mechanism of the operation device by the operation person, becomes strong, when the game becomes fever. If such a tendency can be reflected in the control of the display image, it is expected that the pattern of the image expression is diversified and amusement is raised.

SUMMARY OF THE INVENTION

A main subject matter of the present invention is to provide an entertainment device, which can diversify a representation style of an entertainment image and a computer program to achieve the entertainment device with the computer.

An entertainment device according to the present invention is characterized by comprising: an operation device comprising a plurality of push operation mechanisms, each of which outputs a multi-level signal indicating one of three or more values, which change according to the amount of the push operation; data hold means, which holds an image expression data to display one entertainment image by a different representation style by associating with an identification information of the corresponding representation style and an identification information of said push operation mechanism to which an input is scheduled, and a value of a multi-level signal; detection means to detect a value of the identification information and the multi-level signal of said push operation mechanism input from said operation device; data retrieval means, which specifies the identification information of the detected said push operation mechanism and the identification information of said representation style corresponding to the value of the multi-level signal and retrieves an image expression data corresponding to the identification information of the specified representation style from said data hold means; display control means to change the representation style of a displayed entertainment image based on the retrieved image expression data; and display means to display the entertainment image on a predetermined display unit. It is preferable that a value of said multi-level signal reversibly changes according to an amount of said push operation.

An "entertainment image" is an image, which produces the game or other amusement. An "image expression data" is data for displaying the entertainment image on the display unit and expressing a change in the image. The player character, which is operated by the operation person through the operation device, the possession goods, and the image of an object around the corresponding player character are listed as an example of the entertainment image. The data hold means holds the image expression data to change one of an expression aspect of these images, an action pattern of the player character, an action power of the player character, an effect of possession goods, an action degree of the player characters and the possession goods to the object according to the value of said multi-level signal by associating with the identification information of each of the representation style. The expression aspect is, for example, one of an aspect, which subjectively looks at a circumference from eyes of the player character, an aspect, which objectively looks at a circumference including the player character, and an aspect, in which the player character looks at the object fixedly. An effect of the possession goods is, for example, a size and a power of the possession goods, which continuously change according to the value of the multi-level signal. One of the action degrees of the player character to the object restrains a movement of the player character centering on the specified object.

In such an entertainment device, when an amount of the push operation of the push operation mechanism changes, a multi-level signal corresponding to the change is input thereto. The image expression data is specified by a value of the multi-level signal and the entertainment image of the predetermined expression is displayed on the display unit. Since a multi-level signal has one of three or more values, the display of the image of various patterns becomes possible.

Each of said plurality of push operation mechanisms in the operation device comprises a control button, which enables a operation person the push operation, a conductive material fitted to the control button, a resistance arranged to a position opposed to the conductive material, a push detection circuit, which outputs an analog electric signal corresponding to a contact area of the conductive material and the resistive element changed according to the amount of the push operation of said control button, and a signal conversion circuit, which converts detected electric signals into a multi-level signal, which shows either of a digital value being three or more values, and the multi-level signal output from said signal conversion circuit is input to said detection means one by one. By performing an operation with the operation device constructed by such a configuration, it becomes possible to control digital signal like an analog data.

Another entertainment device according to the present invention is characterized by comprising: an operation device comprising a push operation mechanism, which outputs a multi-level signal indicating one of three or more values which change according to an amount of a push operation and a signal selection mechanism which selectively outputs one of a predetermined plurality of kinds of binary signals; data hold means, which holds an image expression data to display one entertainment image by a different representation style by associating with an identification information of the corresponding representation style and a combination pattern of a value of a multi-level signal and a binary signal to which an input is scheduled; detection means to detect a value of the multi-level signal and the binary signal input from said operation device; data retrieval means which specifies the identification information corresponding to the detected combination pattern and retrieves an image expression data according to a specified identification information from the data hold means; display control means which displays an entertainment image on a display unit and changes a representation style of the displayed entertainment image based on the retrieved image expression data; and display means to display the entertainment image on a predetermined display unit.

In such an entertainment device constructed described above, when the amount of the push operation of the push operation mechanism changes, a multi-level signal corresponding to the change thereof is input. The image expression data is specified by a value of this multi-level signal and the entertainment image of the predetermined expression is displayed on the display unit. Since a multi-level signal has one of three or more values, the display of the image of various patterns becomes possible.

The entertainment device of the present invention can be achieved by reading and executing the program for the entertainment on the computer for the entertainment with which a display unit and above-mentioned operation device are connected. This program usually is a program recorded on a computer readable record medium. If it is a computer readable configuration, it does not necessarily require being recorded on the record medium. The processing, which the computer executes by this program, is the following.

(1) A processing to hold an image expression data to display one entertainment image by a different representation style on a predetermined memory area by associating with an identification information of the corresponding representation style and an identification information of said push operation mechanism to which an input is scheduled, and a value of a multi-level signal;

(2) A processing to detect a value of the identification information and the multi-level signal of said push operation mechanism input from said operation device;

(3) A processing to specify the identification information of the detected said push operation mechanism and the identification information of said representation style corresponding to the value of the multi-level signal and retrieve an image expression data corresponding to the identification information of the specified representation style from said memory area; and (4) A processing to display the entertainment image on a predetermined display unit and change the representation style of a displayed entertainment image based on the retrieved image expression data.

According to the present invention as explained above, since an identification information of the push operation mechanism of the control button and a multi-level signal corresponding to the amount of the push operation of the control button are input and the representation style of the entertainment image can be changed according to the value of the multi-level signal, a particular effect such that the expression of the image of various patterns becomes possible can be obtained compared with a conventional technique.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5A to FIG. 5C show an example of the push detection circuit in a second operation section, and are sectional views in which FIG. 5A shows a state before push operation and FIG. 5B and FIG. 5C show states after push operation;

FIG. 8A to FIG. 8E are figures, which show the setting examples of a function table determined respectively by a game program;

DESCRIPTION OF THE PREFERRED EMBODIMENT

Hereafter, an embodiment, in which an entertainment device according to the present invention is applied to a video game machine, will be explained. The video game machine expresses an image such as player characters, possession goods, and objects around the player characters (in this embodiment, it may be called as a "game image") on the display unit by the game program recorded on a disk such as CD-ROM and DVD-ROM.

Figure 1:
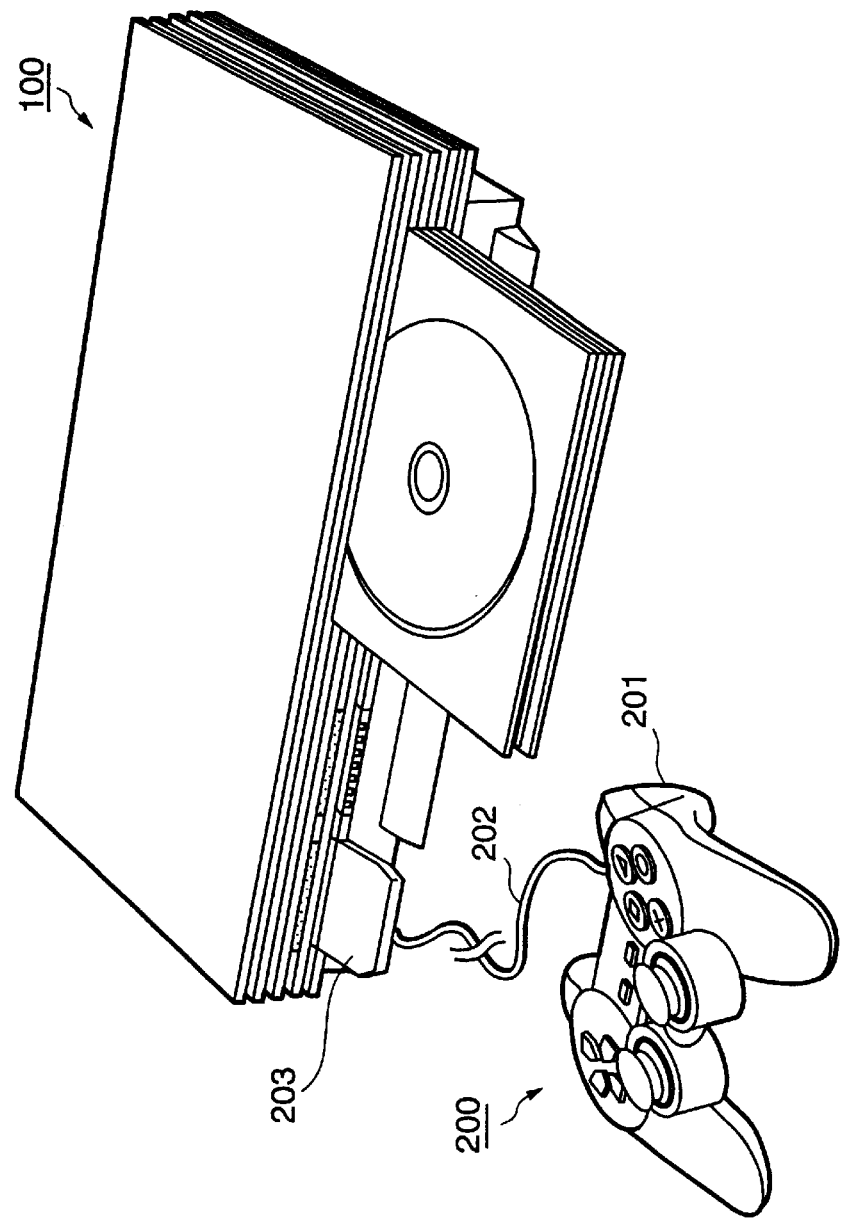
FIG. 1 is an entire configuration figure of a video game machine, to which the present invention is applied.

FIG. 1 is an entire configuration figure of a video game machine according to the embodiment.

The video game machine comprises a game machine main body 100 connected with a display unit (not shown in the figure) and an operation device 200 connected with the game machine main body 100. A connection of the operation device 200 to the game machine main body 100 is performed through a connection code 202 extended from the device main body 201. A connector 203 is provided to an end of the connection code 202, and the operation device 200 is connected with the game machine main body 100 by inserting the connector 203 in a jack provided on one side of the game machine main body 100.

<GAME MACHINE MAIN BODY>

Figure 2:
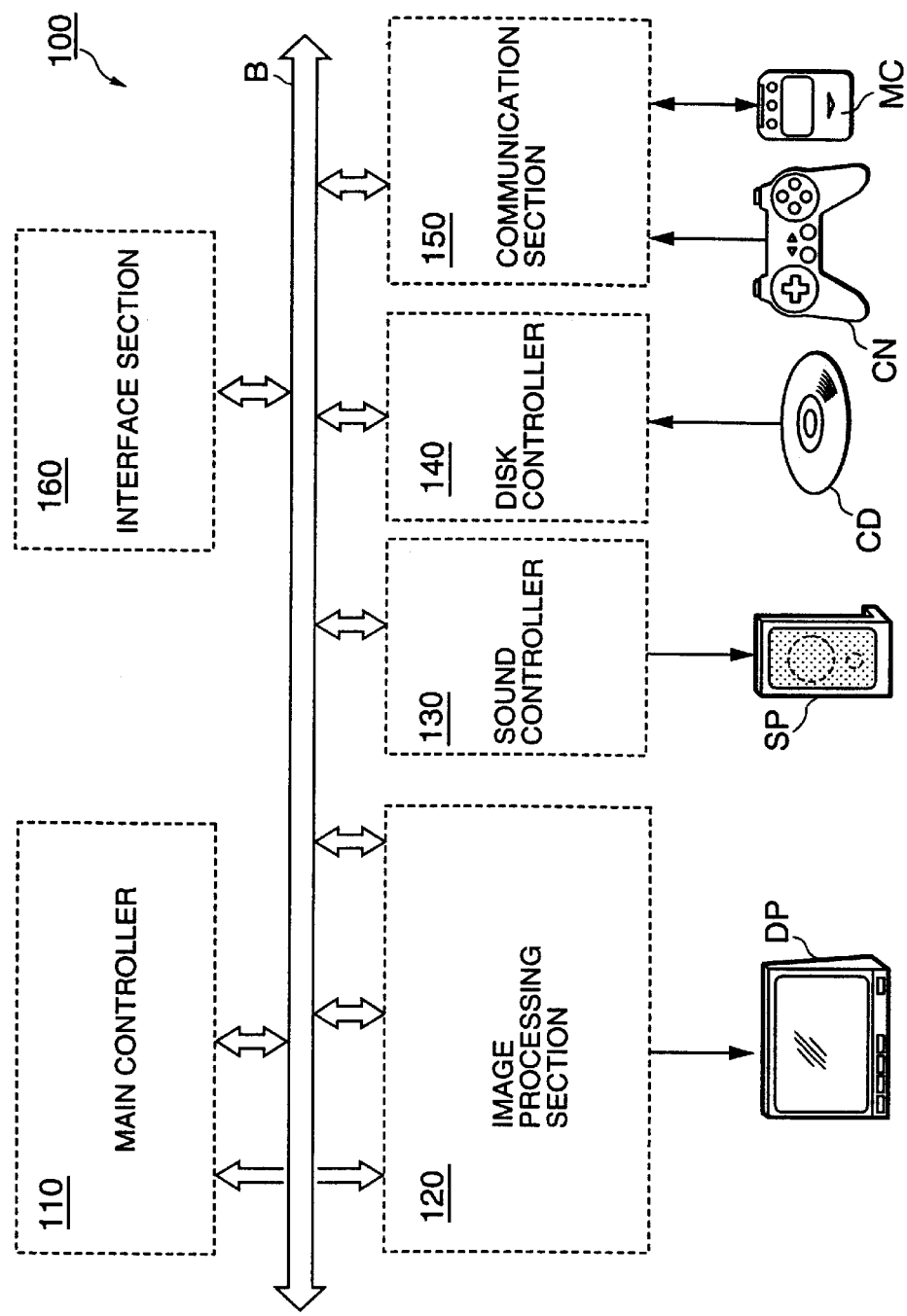
FIG. 2 is a configuration figure of the game machine main body.

The game machine main body 100 comprises a main controller 110, a image processing section 120, an acoustic controller 130, a disk controller 140, a communication controller 150, an interface section 160, and a main bus B which connects each of above-mentioned sections 110 to 160 with two-way communicable, as shown in FIG. 2. The main controller 110 comprises a CPU, a peripheral device controller, which performs an interruption control and a DMA (direct memory access) transfer control etc., a RAM (main memory) to temporarily record a game program etc., and a ROM etc., in which a control program etc. performing a generalized management and controlling each section of devices are stored. The CPU is a RISC (reduced instruction set computer) CPU and achieves a plurality of functions described later based on the control program recorded on the ROM and the game program developed on the main memory.

The image processing section 120 comprises a geometry transfer engine, which performs a coordinate transformation of the image data to be displayed, etc., a graphics processing unit, which performs a drawing processing of the game image, which consists of the combination of polygon and sprite (polygon, which is triangular and is the quadrangle, etc.), etc. based on the drawing instruction from the main controller 110, a frame buffer which temporarily records the game image to which the drawing processing is performed, and an image decoder etc. performing a decode processing of the image data if necessary. A display unit DP reads and displays the image recorded on the frame buffer. The game image, which includes a moving image element, for instance, the movement of the character and the change of the expression, etc. can be displayed on the display unit DP by continuously performing such a drawing processing and the record on the frame buffer.

The acoustic controller 130 comprises a sound reproduction processing processor, which reproduces a music by controlling the main controller 110 and a sound buffer etc. to temporarily record the music data. The music data recorded on the sound buffer is output to a speaker SP.

The disk controller 140 comprises a disk drive device to reproduce the game program and the data recorded on the disks such as CD-ROM and DVD-ROM to be recognized by the main controller 110 (hereafter, the reproduced data is called as a "reproduction data"), a CD-ROM decoder, which decodes an ECC (error correction code) when the ECC is added to the reproduction data, and a buffer etc. which temporarily record the reproduction data before the reproduction data from the disk drive device is recorded on the main memory.

The communication controller 150 comprises a communication control device, which performs the communication control to the main controller 110 through the main bus B. The operation device 200 and an exchangeable memory card MC, which is one of the nonvolatile record media, are detachably fitted to the communication controller 150. The content operated with the operation device 200 is transmitted to the communication control device by a synchronous communication. The communication control device transmits the content of the operation sent from the operation device 200 to the main controller 110. Thereby, the intention of the operation person is transmitted to the main controller 110, and the main controller 110 can perform the processing according to the intention of the operation person based on the executed game program. The communication control device records the data on the memory card MC and reads the data recorded thereon based on the instruction from the main controller 110. Since the memory card MC is separated from the main bus B, it can be detached at a power on state.

The interface section 160 connects an external electronic equipment, and takes the external data from the connected external electronic equipment.

<OPERATION DEVICE>

Figure 3:
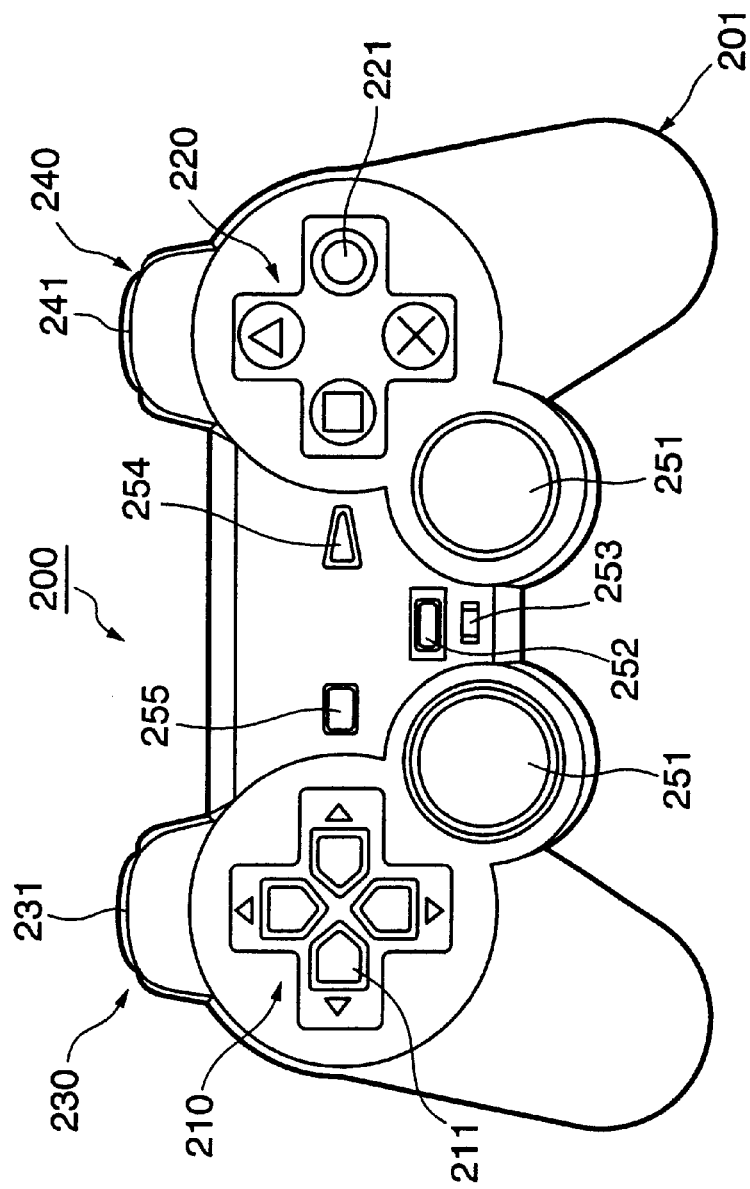
FIG. 3 is a plan view, which shows an example of a configuration of an operation surface of the operation device.

FIG. 3 is a front figure of the operation device 200. The first operation section 210 and the second operation section 220 are provided on an upper surface of the device main body 201 of the operation device 200, and the third operation section 230 and the fourth operation section 240 are provided on the side surface thereof.

The first operation section 210 comprises a cross-shaped four operation bodies 211 for the push operation to form a control button with the operation bodies 211. The first operation section 210 is an operation section to give a predetermined operation to the image, for instance, the player character displayed on the screen of the display unit DP, and the function to move the player character or the aspect up and down and right and left is allocated by performing push operations of the operation bodies 211.

The second operation section 220 comprises column-shaped four operation buttons 221 for the push operation. Since an identification mark is fixed to a head of each operation button 221, and a function allocated to each operation button 221 can be easily identified. A function according to the game program recorded on the disk is set to the second operation section 220. For example, a function to change the state of the player character is allocated to each operation button 221.

The third operation section 230 and the fourth operation section 240 have almost the same structure, and comprise two operation buttons 231, 241 (total: 4 buttons), in which two buttons are aligned, for the push operation. The functions of the third operation section 230 and the fourth operation section 240 are set by the program recorded on the disk.

A couple of joysticks 251 are further provided for analog operation to the operation device main body 201. The joystick 251 becomes possible to use by switching to or with the first and second operation sections 210, 220. Switching is performed by an analog select switch 252 provided on the device main body 201. When the joystick 251 is selected, a display part 253, which is provided on the operation device main body 201, is lightened and the selection of the joystick 251 is displayed.

In addition, a start switch 254, which directs a start of the game, and a select switch 255 to select difficulty etc. of the game at the game initiation, etc. are provided to the operation device main body 201.

Figure 4:
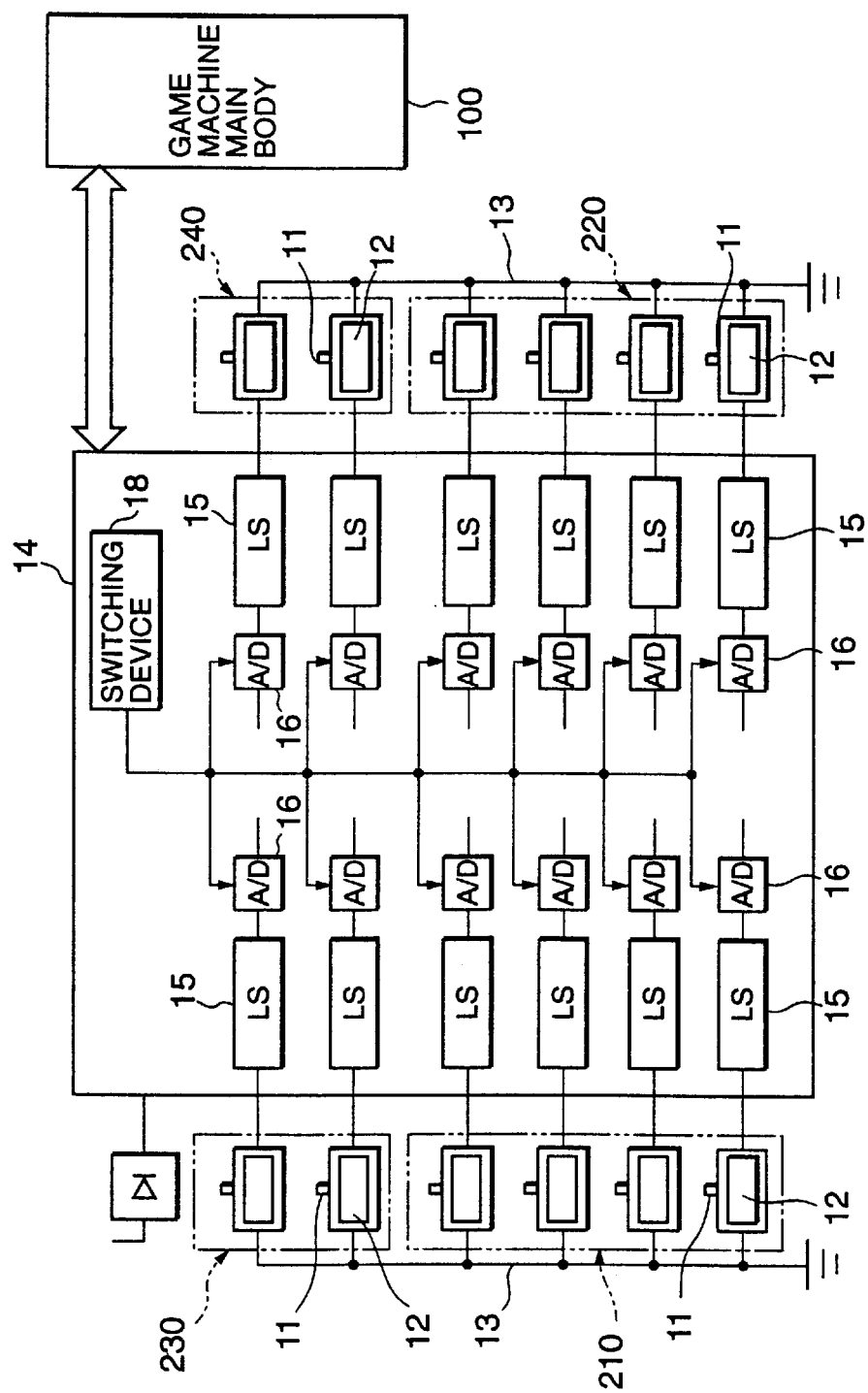
FIG. 4 is an internal configuration figure of the operation device.

FIG. 4 is an internal configuration figure of the operation device 200. Each of the operation sections 210, 220, 230, 240 in the operation device 200 comprises the control buttons 11, which are constructed by operation body 211 and operation buttons 221, 231, 241, and a push detection circuits 12, which detect the amount of the push operation by the operation person therein, respectively.

The push detection circuit 12 has a configuration, which forms a conductive material with elasticity at one of two end portions positioned at the opposed position in each control button 11 and the resistive element at another end thereof. The resistive element is connected with the power supply line 13, and the predetermined voltage is applied thereto from the power supply (Vcc). The electric resistance between a conductive material and the resistive element changes in an analog fashion according to the amount of the push power, which acts to the control button 11.

The push detection circuit 12 in the second operation section 220 will be explained referring to FIG. 5A to FIG. 5C and FIG. 6 as an example.

Figure 5A:
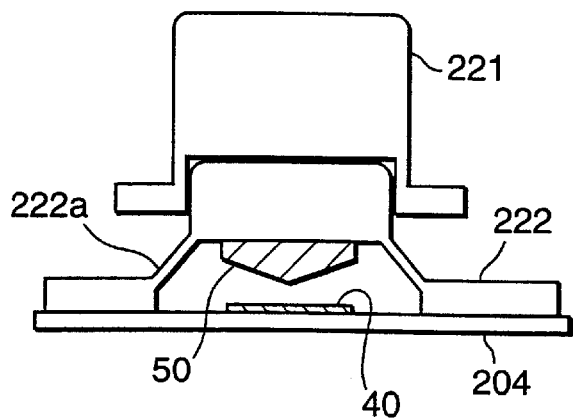
Figure 5B:
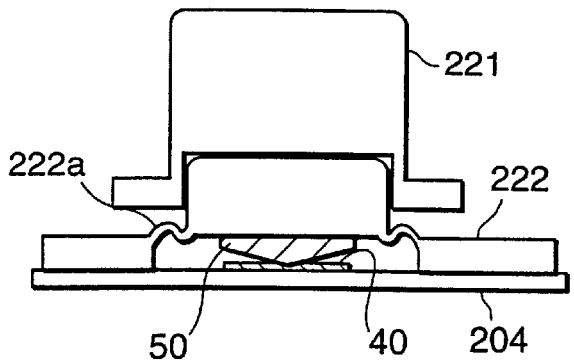
Figure 5C:
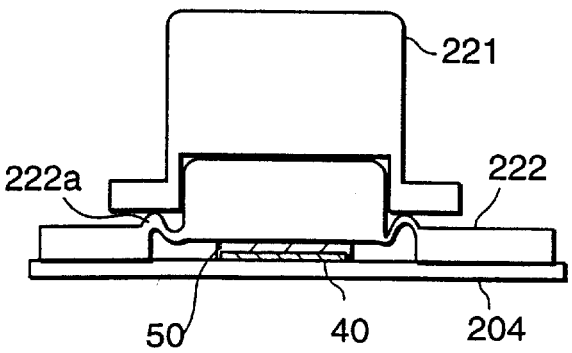

FIG. 5A shows a state before a push operation and FIG. 5B and FIG. 5C show a state and a push operation.

Before push operation, the operation button 221 is supported by the upper wall of an elasticity part 222a, which projects above an elasticity body 222, which consists of an insulation rubber etc. In this state, a first conductive material 50 provided on a lower wall of an elasticity part 222a and a resistive element 40 provided on an internal substrate 204 are separated. The conductive material 50 consists of, for example, a conductive rubber with elasticity. In the example shown in FIG. 5A to FIG. 5C, the conductive material 50 is formed in a conical shape whose center is a top thereof.

When the operation button 221 is pushed, a slope part in the elasticity part 222a warps and moves the upper wall downward with the operation button 221, and the conductive material 50 contacts with the resistive element 40. The conductive material 50 deforms according to the push power of the operation button 221 (that is, a contact pressure with the resistive element 40), and changes a contact area to the resistive element 40 as shown in FIG. 5B and FIG. 5C. That is, when the push power of the operation button 221 is weak, as shown in FIG. 5B, the vicinity of the top of the conical-shaped conductive material 50 contacts with the resistive element 40. Then, the push power of the operation button 221 is further strengthened, the conductive material 50 is gradually deformed from the top part and the contact area extends. Since the power supply line 13 (see FIG. 4) is connected with the resistive element 40 as mentioned above, the contact part with the conductive material 50 becomes equivalent to the variable resistance. That is, when the conductive material 50 contacts with the resistive element 40, since the conductive material 50 becomes a bridge to flow current, a resistance of the contact part becomes small. Therefore, the resistance of the resistive element 40 decreases by enlarging the contact area of the conductive material 50. This resistance becomes reversible for the amount of the push operation.

In this embodiment, the output terminal is provided to the vicinity of an intermediate part of the resistive element 40. An analog signal, which corresponds to the push power of the operation button 221, is output to the MPU 14 described later from the output terminal.

When the push power to the operation button 221 is released, a slope part of the warped elasticity part 222a is flexibly snapped back, the operation button 221 is pushed up, and is returned to the state of FIG. 5A.

Figure 6:
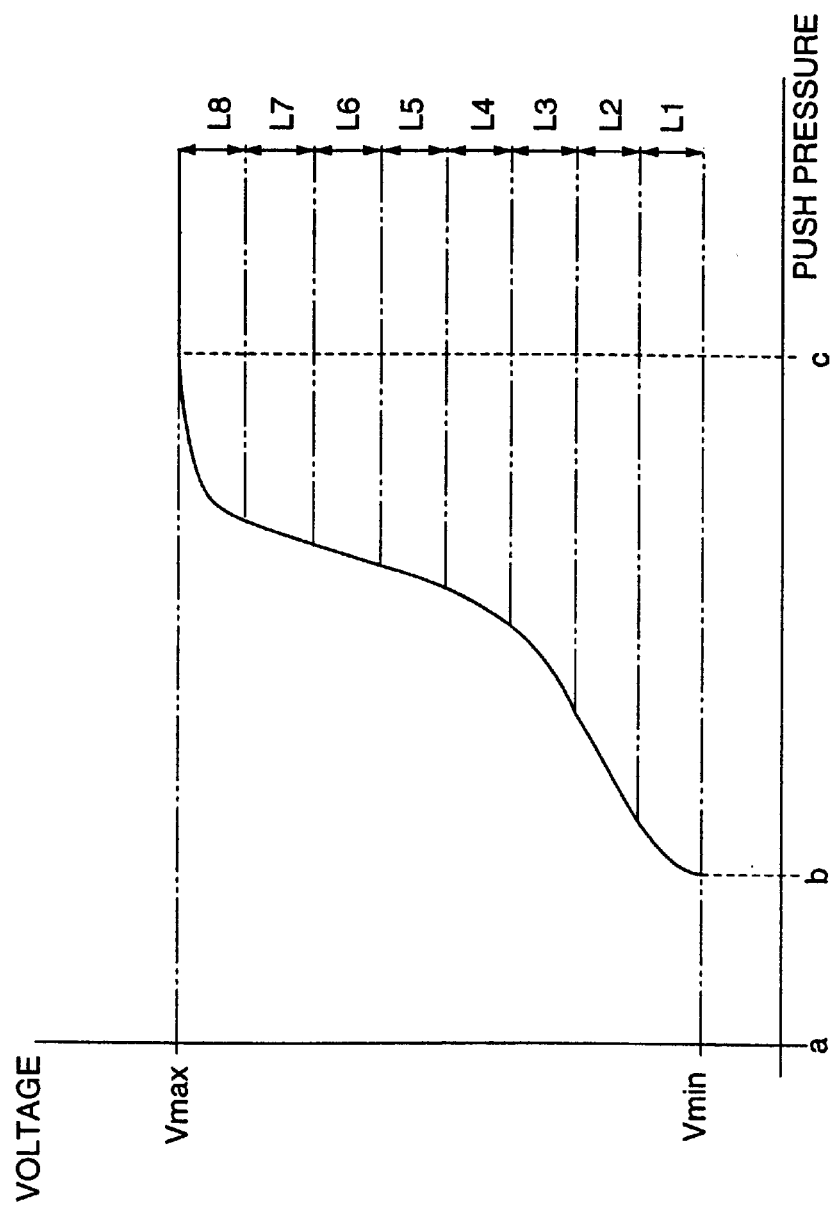
FIG. 6 is a characteristic diagram of a push detection circuit according to the embodiment.

FIG. 6 is a figure, which shows an analog signal (voltage) characteristic output from the output terminal of the resistive element 40. Since the voltage is applied to the resistive element 40 when the power supply is turned on, even if the operation button 221 is not pushed, a constant analog signal (voltage) Vmin is output from the output terminal (a in the figure). The resistance of the resistive element 40 does not change until the conductive material 50 contacts with the resistive element 40 even when the operation button 221 is pushed. Therefore, the output from the resistive element 40 is Vmin and is not changed. In addition, when the operation button 221 is pushed, and the conductive material 50 contacts with the resistive element 40 (b in the figure), the contact area of the conductive material 50 to the resistive element 40 increases according to the push power of the operation button 221. Therefore, the resistance of the resistive element 40 decreases and the analog signal (voltage) output from the output terminal increases. The analog signal (voltage) output from the output terminal at the position where the conductive material 50 is most deformed becomes maximum Vmax (c in the figure).

The above-mentioned operation principle in the push detection circuit 12 is similar in the control button of other operation sections 210, 230, 240.

In FIG. 4, an MPU (microprocessor unit) 14, which controls the operation device 200, is provided in an internal substrate of the operation device 200. The MPU 14 identifies each of operation sections 210, 220, 230, 240 and the control buttons thereof. The MPU 14 comprises each function of a level division part (LS) 15, which divides the output level of the analog signal output from the push detection circuit 12 of each control button into a plurality of output levels, an A/D converter section 16, which converts the analog signal output from the push detection circuit 12 to the digital signal according to each output level divided by the level division part 15, and a switching device 18.

The level division part 15 divides a preset range of the level of the analog signal (voltage) by even width. The number of division can be arbitrarily set. In the example of FIG. 6, the range of the level of an analog signal (voltage) is evenly divided into eight. The individual output levels L1 to L8 evenly divided as described above is transmitted to the A/D converter section 16. The range of the level of the analog signal evenly divided by the level division part 15 can be arbitrarily changed.

The A/D converter section 16 converts the analog signal to the digital signal and outputs it according to the output level of the analog signal, which is divided by the level division part 15. For example, a digital multi-level signal in 16-bits is allocated to each above-mentioned output level, and a multi-level signal such as "1f" in level 1, "3f" in level 2, . . . , "ff" in level 8.

The A/D converter section 16 has a function to output the binarized digital signal (that is, "1" or "0") according to the change of the analog signal output from the push detection circuit 12. One of a multi-level signal or a binary signal is output from the A/D converter section 16 by the switch operation of the switching device 18. A binary signal is used to select only the one typical function when only one function is allocated to a certain control button or when the plurality of functions are allocated at one control button.

The switching device 18 is usually controlled by the control signal sent from game machine main body 100 based on the game program recorded on the disk. That is, the control signal, which specifies whether A/D converter section 16 is functioned as means to output a multi-level signal or means to output a binary signal function is output from the game machine main body 100 according to the content of the game program. The switching device 18 switches the function of the function of the A/D converter section 16 to the specified function based on the control signal.

The switching device 18 is controlled by a manual operation of the operation person. For example, a configuration, which switches the function of A/D converter section 16, can be achieved by allocating the function of switching the switching device 18 to the analog select switch 252 provided on the operation device 200 and operating the switching device 18 by the manual operation of this switch 252.

The multi-level signal or the binary signal output from the A/D converter section 16 is sent to the game machine main body 100 through an interface circuit (not shown in the figure) provided on an internal substrate of the operation device 200. The display control of the game image is performed by these signals.

<VIDEO GAME MACHINE>

In the game machine main body 100 with which the operation device 200 constructed as described above is connected, when the power supply turning on or a reset processing in a state that the disk is set in the disk controller 140 is performed, the CPU of the main controller 110 executes the OS recorded on the ROM. When the OS is executed, the CPU initializes the entire device of the operation confirmation etc., and controls the disk controller 140 to develop the game program recorded on the disk to the main memory and execute it. The data recorded on the memory card MC is read at any time if necessary. The CPU forms the function block shown in FIG. 7 to achieve the video game machine 300 by executing this game program.

Figure 7:
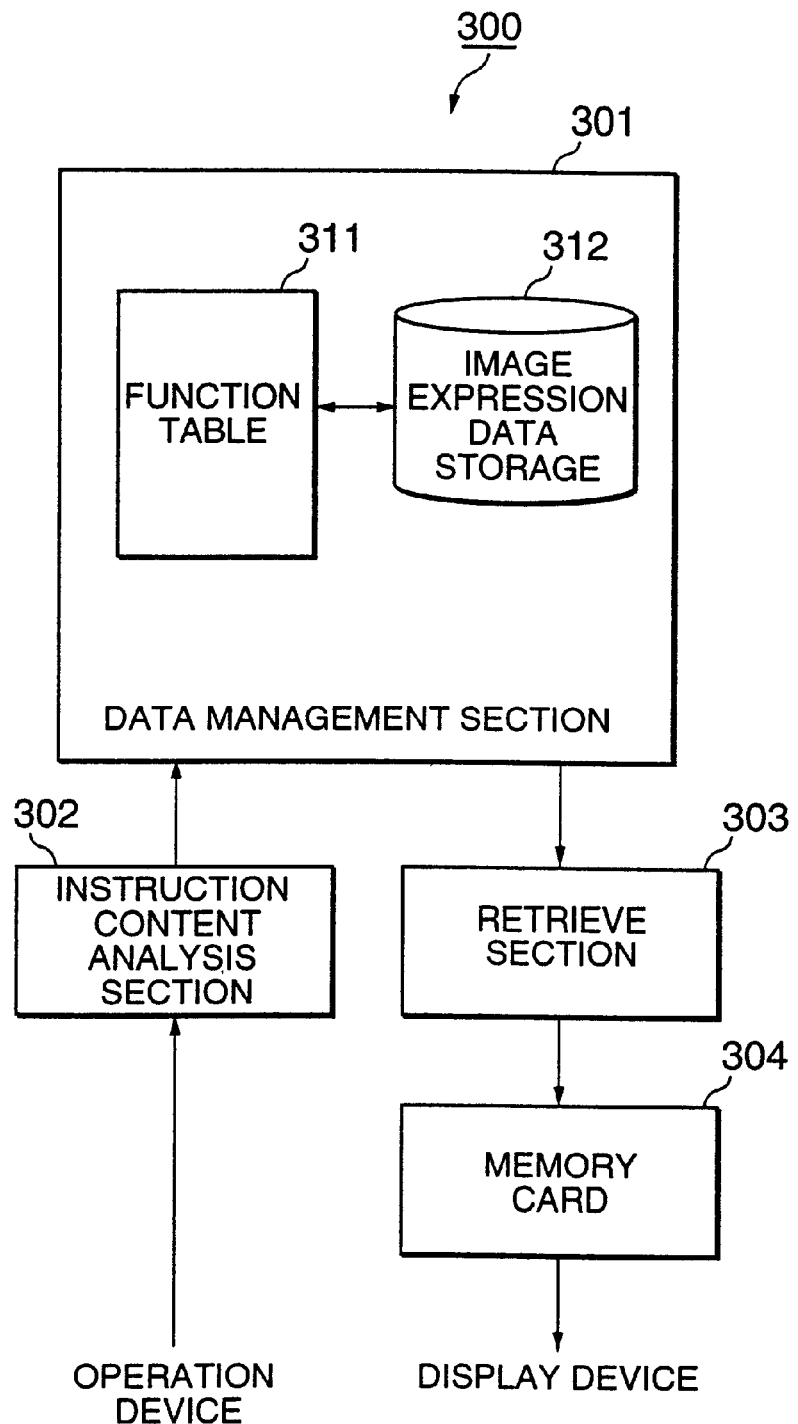
FIG. 7 is a function configuration figure of the video game machine of the embodiment.

This video game machine 300 has functions of a data management section 301, an instruction content analysis section 302, a retrieval section 303, and a display controller 304 as shown in FIG. 7.

The data management section 301 displays the game image on the display unit DP, and manages the image expression data to control the representation style. To improve the efficiency of the data management, the data management section 301 comprises a function table 311 in this embodiment. The storage address of the image expression data in the image expression data storage section 312, which is associated with the identification information of the representation style, the identification information of the control button to which an input is scheduled and the output level, are recorded on this function table 311. The content of the function table 311 is different by the executed game program.

An example of the representation style is taken by a change of one of a player character and the possession goods thereof (for example, arms), an expression aspect of an image of a peripheral object of the corresponding player character (other party character etc.), an action pattern of the player character, an action power of the player character, an effect of one of the possession goods or an action degree of the player character or possession goods to object.

The identification information to identify these representation styles to the other representation styles and the storage address of the image expression data are associated with each other, are recorded (set) on the function table 311. Thereby, since the corresponding image expression data is promptly retrieved, the image display to the display unit DP is promptly performed. The content of the function table 311 can be updated in ex post.

The above-mentioned expression aspect may be, for example, an aspect, which subjectively looks at the circumference from eyes of the player character, an aspect, which objectively looks at a circumference including the player character, or, an aspect to which the player character looks at the object fixedly. A flexible image expression according to the game development becomes possible by being possible to express such an aspect. One of the effects of the possession goods is assumed to be a size and a power of the corresponding possession goods continuously changed according to the value of the multi-level signal. In addition, one of the action degrees of the player character to objects is assumed to restrain the movement of the player character centering on the specified object. By adopting such a pattern, feelings of the operation person at being in the state, that the player becomes fever to the game, in the content of the operation can be faithfully reflected and the zest of the game can be increased.

The data of the content shown in FIG. 8A to FIG. 8E is specifically set in the function table 311.

(1-1) and (1-2) show contents for a first game program, (2-1) and (2-2) show contents for a second game program, (3-1) and (3-2) show contents for a third game program, (4-1) and (4-2) show contents for a fourth game program, and (5-1) to (5-3) show contents for a fifth game program.

Figure 9A:
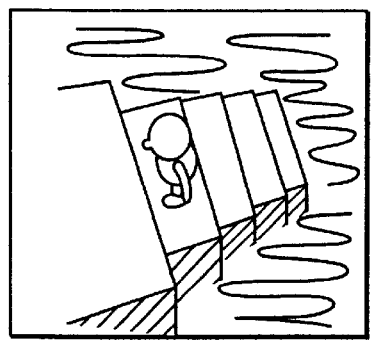
FIG. 9A and FIG. 9B are explanation figures (objective aspect), which show an appearance where an aspect is moved according to a level of a multi-level signal.
Figure 9B:
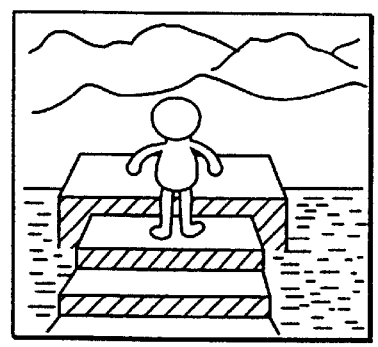

(1-1) is a setting example when the operation button 231 is pushed and the output level is less than 4f, and the image expression data moves to the position (objective aspect) where the displayed aspect objectively looks at from the back side of the player character to forward can be output. The aspect position may be moved at obliquely upper side. FIG. 9A and FIG. 9B are screen explanation figures before and after push operations, respectively.

(1-2) is a setting example when the operation button 231 is pushed and the output level is 4f or more, and the image expression data moves to the position (subjective aspect), where the aspect subjectively looks at from eyes of the player character, can be output. In this case, the circumference of the player character can be looked by operating a directional key of the operation button 211.

Figure 10E:
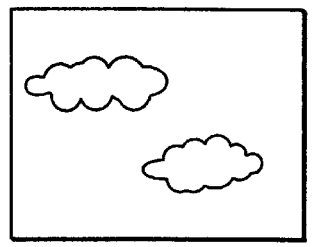
FIG. 10A to FIG. 10E are explanation figures (subjective aspect), which show an appearance where an aspect is moved according to a level of a multi-level signal.
Figure 10B:
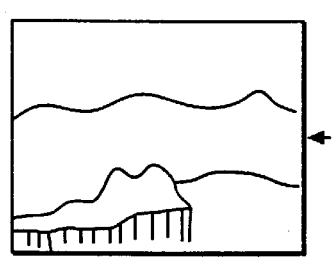
Figure 10A:
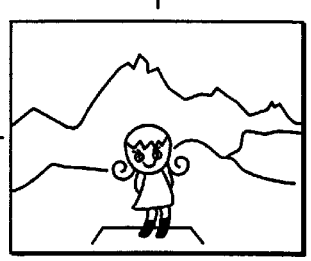
Figure 10C:
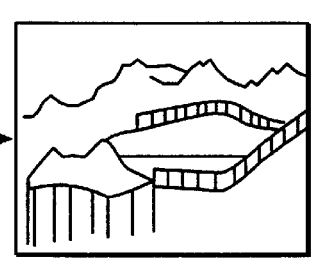
Figure 10D:
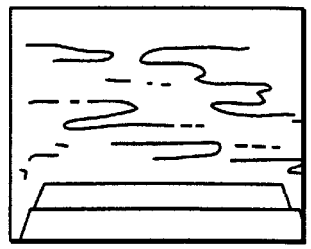

FIG. 10A to FIG. 10E is figures, which show an appearance, FIG. 10A is a screen explanation figure, which shows a subjective aspect, FIG. 10B is a screen explanation figure, which shows a surrounding of the left side of the player character, FIG. 10C is a screen explanation figure, which shows a surrounding of the right side of the player character, FIG. 10D is a screen explanation figure, which shows one's feet of the player character, and FIG. 10E is a screen explanation figure, which shows the sky above the player character.

(2-1) is similar to above-mentioned (1-1).

(2-2) is a setting example when the aspect is locked-on at the position which looks at the object with a high importance degree in the screen (other party character and signboard, etc.), and the image expression data to which the player character moves and rotates around the locked-on object with a directional key to the operation button 211 can be output.

Figures 11A, 11B, 11C:
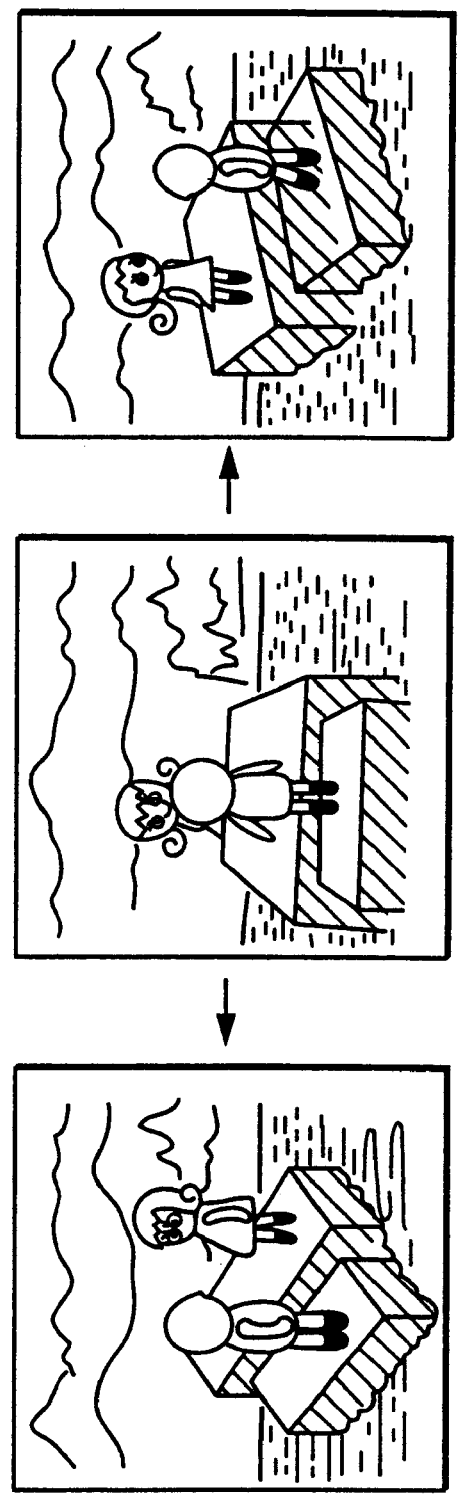
FIG. 11A to FIG. 11C are explanation figures, which show an appearance whose aspect moves according to a level of a multi-level signal.

FIG. 11A to FIG. 11C are screen explanation figures, which show an appearance. FIG. 11A shows a state to lock-on the other party character. FIG. 11B shows a state that the player character turns left around the other party character. FIG. 11C shows a state that the player character turns right around the other party character.

(3-1) is a setting example when "◯" of the operation button 221 is pushed and the output level is less than 5f, and data of the expression of the image of the representation style in which the player character watches the object in vicinity thereof can be output.

(3-2) is a setting example when "◯" of the operation button 221 is pushed and the output level is 5f or more, and data of the expression of the image of the representation style in which the player character checks the object in vicinity thereof can be output.

(4-1) is a setting example when "X" of the operation button 221 is pushed and the output level is less than 5f, and data of the expression of the image of the representation style in which the player character runs can be output.

(4-2) is a setting example when "X" of the operation button 221 is pushed and the output level is 5f or more, and data of the expression of the image of the representation style in which the player character jumps can be output.

(5-1) is a setting example when "◯" of the operation button 221 is pushed and the output level is less than 2f, and data of the expression of the image of the representation style, in which the player character attacks to the other party character with weak powers can be output.

(5-2) is a setting example when "◯" of the operation button 221 is pushed and the output level is less than 6f from 2f, and data of the expression of the image of the representation style in which attacks to the other party character with medium powers can be output.

(5-3) is a setting example when "◯" of the operation button 221 is pushed and the output level is 6f or more, and data of the expression of the image of the representation style in which the player attacks to the other party character with strong powers can be output. In these setting examples, the intensity of powers is postponed arms by strengthening of powers when attacking, for example, with arms (sword and spear, etc.) and reaches the enemy (other party character) in the distance. In this case, the size of arms are continuously zoomed-in according to the output level.

An example of five combination patterns is easily showed, but the combination pattern has the possibility that only the kind of control button and the number of combinations of outputs level 1f to ff are recorded.

The instruction content analysis section 302 detects the value of identification information and the multi-level signal of the control button actually input from the operation device 200. The detection result is passed to the retrieval section 303. The retrieval section 303 refers above-mentioned function table 311 and retrieves the corresponding image expression data from the image expression data storage section 312 by setting the value of identification information and a multi-level signal of detected control button as a key. The display controller 304 changes the representation style of the displayed entertainment image based on the image expression data, which is retrieved.

Next, a use of above-mentioned video game machine 300 will be explained.

Figure 12:
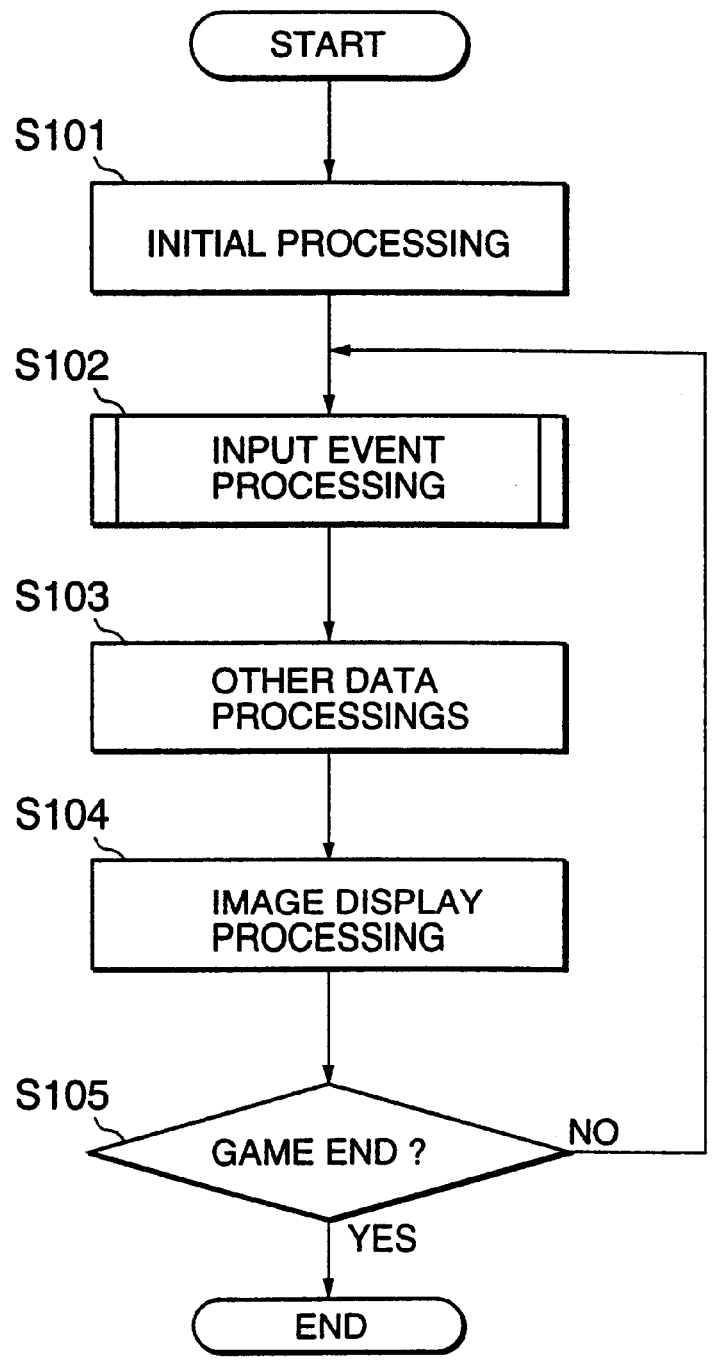
FIG. 12 is an outline procedure figure of a use method of a video game machine.

In the video game machine 300, first, an initial processing is performed as shown in FIG. 12 (step S101). The initial processing is an environmental construction processing in the game machine main body 100 for the operation person to be able to start or restart the game after the game program is started. The content of this environmental construction processing is determined according to the read game program.

Figure 13:
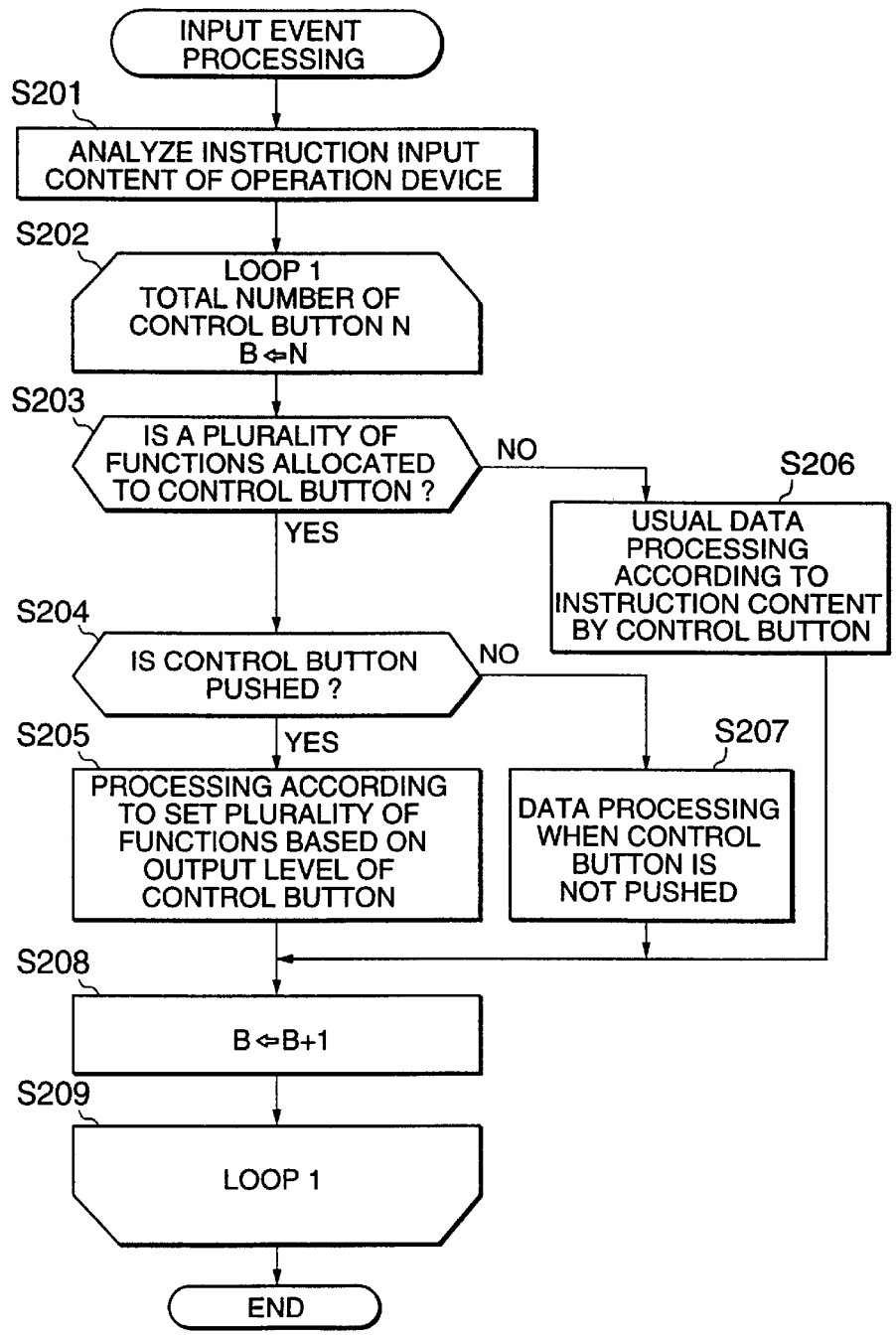
FIG. 13 is a detailed procedure figure of an input event processing in an video game machine.

After initial processing ends, an input event processing, which is the image processing based on the content directed by the operation person through the operation device 200 is performed (step S102). The content of the input event processing is a processing as shown in FIG. 13. That is, the content of the instruction input of the operation device 200 is analyzed (step S201, S202), the identification information on the control button actually operated from the total number of the control buttons of the operation device 200 is specified, and whether a plurality of functions are allocated to the control button (operation button) specified by the identification information referring to above-mentioned function table 311 is checked (step S203). When the plurality of functions are allocated, whether the control button is pushed by the operation person is judged (Yes in step S203, S204), the output level is detected when the control button is pushed. A processing according to the set content of the function based on the detected output level is performed (Yes in step S204, S205).

Specifically, a case that the operated control button is "◯" of the operation button 221 to which the plurality of functions are allocated, and these operation buttons 221 are one of above-mentioned (5-1) to (5-3) will be explained, when the detected output level is less than 2f, the image processing is performed so that the image processing for "weak power attack", that is, in which the player character displayed on the display unit DP attacks to the other party character with weak powers (5-1). Similarly, when the detected output level is less than 6f from 2f, the image processing for "medium power attack" is performed (5-2). When the output level of the detected output level is 6f or more, the image processing for "strong power attack" is performed (5-3).

In step S203 when the plurality of functions are not allocated, a usual data processing allocated to the corresponding control button with a binary signal is performed (No in step S203, S206). In step S204, when the control button is not pushed, the data processing, for instance, the idling processing is performed (No in step S204, S207). The above-mentioned processings are performed to the corresponding control buttons (step s208, S209).

In FIG. 12, after finishing the input event processing, other data processings are performed (step S103) if necessary and the game image is displayed on the display unit DP (step S103). This processing is repeated until the instruction of the game end is input (step S105).

As described above, in the video game machine 300 according to the embodiment, since a mechanism, which outputs a multi-level signal that the value reversibly changes in each operation button, which constructs the operation button, according to the amount of the push operation, a plurality of functions can be allocated to one control button. Therefore, it becomes possible to produce various representation styles comparing with a conventional technique which can control the representation style only by two steps of on or off, and can allocate only one function to one control button. The synergy effect can be expected when each function has mutual relationship.

The present invention is not limited to the content of the above-mentioned embodiment and various modifications are possible.

For example, the explanation of the above-mentioned is an example for providing the push operation mechanism, which outputs a multi-level signal to an individual operation button. A principal object of the present invention is to provide the push operation mechanism, which outputs a multi-level signal, which becomes a value different according to the amount of the push operation, and to change the representation style of the image depending on this multi-level signal. Therefore, the push operation mechanism is provided to the only a part of the operation button, and various representation styles can be produced by the combinations of the contents of the operations of the operation buttons with the push operation mechanism and the contents of the operations of other operation buttons without the push operation mechanism.

In this case, other operation buttons may be functioned as a signal selection mechanism, which selectively outputs either of two or more kinds of binary signals, which are prepared beforehand, and may be recorded on the above-mentioned function table 311 by associating with the address of the image expression data and the combination pattern of a value of a multi-level signal in which the identification information of the representation style and the input are scheduled and a binary signal.

As a mechanism to reversibly change the value of an analog signal according to the amount of the push operation, in this embodiment, the conductive material 50 and the resistive element 40 are used and the value of the analog signal is determined by bigness and smallness of the contact area thereof. A general-purpose pressure sensitive element may be used and the push power detected with the pressure sensitive element may be converted into an analog signal.

In the above-mentioned embodiment, the example when the present invention is applied to the video game machine is explained. The entertainment device of the present invention can be also achieved in the personal computer, etc., by loading a program for entertainment recorded on the computer readable record medium or, the program for the entertainment acquired through the network etc. The operation device in this case, may be special goods of the corresponding personal computer specification which is equal to the operation device 200 explained by the embodiment, and may be the one that the function like above-mentioned the operation device 200 adding the above-mentioned push operation mechanism to the type face part of the keyboard is provided.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An entertainment device that creates an entertainment image on a predetermined display unit in response to a multi-level signal supplied from a gamepad associated therewith, the gamepad having two or more push operation mechanisms each of which is adapted to produce a multi-level signal representing each of three or more values that vary in relation to a pressure with which a corresponding push operation mechanism is pressed, said entertainment device comprising:

data holding means for holding image description data used to display different representations of a given entertainment image, the image description data for each representation being further associated with identification information of the representation, identification information of the push operation mechanism, and a value of the multi-level signal;

detection means for detecting the identification information of the push operation mechanism and the value of the multi-level signal that are supplied from the gamepad;

data retrieval means that specifies the identification information of the representation corresponding to the detected identification information of the push operation mechanism and the detected value of the multi-level signal, and retrieves the image description data associated with the specified identification information of the representation from said data holding means; and display control means that displays a representation of the entertainment image on the predetermined display unit that corresponds to the retrieved image description data.

2. The entertainment device as claimed in claim 1, wherein the value of the multi-level signal supplied from at least one push operation mechanism varies in a reversible manner with the corresponding pressure with which the at least one push operation mechanism is pressed.

3. The entertainment device as claimed in claim 1, wherein each push operation mechanism of the gamepad comprises a terminal contact that reflects pushes of the push operation mechanism by the user, a conductive material attached to the terminal contact, a resistive element positioned opposed to the conductive material, a push detection circuit adapted to produce an analog electric signal in accordance with the size of the contact area between the conductive material and the resistive element, the size of the contact area being varied with relation to the pressure with which the push operation mechanism is pressed, and a signal conversion circuit that converts a detected electric signal into a multi-level signal representing one of three or more digital values, the multi-level signal being successively supplied from the signal conversion circuit to said detection means.

4. The entertainment device as claimed in claim 1, wherein the entertainment image comprises images of a player character and its belongings as well as images of objects around the player character which are to be controlled by the user through the gamepad, and said data hold means is adapted to hold the image description data in association with the identification information of the respective representations, the image description data being for varying, based on the value of the multi-level signal, at least one of perspectives from these images, an action pattern of the player character, a behavior of the player character, an energy and leverage of the player character, effects of one or more belongings of the player character, degrees of influence of the player character on one or more objects, and degrees of influence of one or more belongings of the player character on one or more objects.

5. The entertainment device as claimed in claim 4, wherein each of the perspectives is one of a subjective perspective of the player character looking at its surroundings, an objective perspective to the surroundings including the player character, and a fixed perspective of the player character looking at the object.

6. The entertainment device as claimed in claim 4, wherein the effects of the belongings are the size and power of the belongings.

7. The entertainment device as claimed in claim 4, wherein one degree of influence of the player character on the object corresponds to a limitation of movement of the player character to or around a designated object.

8. An entertainment device that creates an entertainment image on a predetermined display unit in response to a multi-level signal supplied from a gamepad associated therewith, the gamepad having a push operation mechanism and a signal selection mechanism, the push operation mechanism being adapted to produce a multi-level signal representing each of three or more values that vary in relation to a pressure with which a corresponding push operation is pressed, the signal selection mechanism being adapted to selectively produce either of different predetermined binary signals, said entertainment device comprising data holding means for holding image description data used to provide different representations of a given entertainment image, the image description data for each representation being further associated with identification information of the representation, and a combination pattern of a value of a multi-level signal and a binary signal which are to be received;

detection means for detecting the combination pattern of the value of the multi-level signal and the binary signal input that are supplied from the gamepad;

data retrieval means that specifies the identification information corresponding to the detected combination pattern, and retrieves the image description data associated with the specified identification information from said data holding means; and display control means that causes the predetermined display unit to display the entertainment image, and changes the representation of a currently displayed entertainment image in accordance with the retrieved image description data.

9. An entertainment device that creates an entertainment image on a predetermined display unit, comprising:

a gamepad having two or more push operation mechanisms, each of which is adapted to produce a multi-level signal representing each of three or more values that vary in relation to a pressure with which a corresponding push operation mechanism is pressed;

data holding means for holding image description data used to display different representations of a given entertainment image, the image description data for each representation being further associated with identification information of the representation, and identification information of the push operation mechanism and the value of the multi-level signal that are supplied from the gamepad;

detection means for detecting the identification information of the push operation mechanism and the value of the multi-level signal, for specifying the identification information of the representation and retrieving the image description data from said data holding means that is associated with the specified identification information of the representation; and display control means that displays the representation of the entertainment image on the predetermined display unit in accordance with the retrieved image description data.

10. A computer readable record medium on which a program is stored, the program being for causing a computer connected to a predetermined display unit and a gamepad having two or more push operation mechanisms each of which is adapted to produce a multi-value signal representing each of three or more values vary in relation to a pressure with which a corresponding push operation mechanism is pressed, the computer readable record medium comprising:

(1) first program code for holding, in a predetermined memory region, image description data used to display different representations of a given entertainment image, the image description data for each representation being further associated with identification information of the representation, identification information of the push operation mechanism, and a value of a multi-level signal;

(2) second program code for detecting the identification information of the push operation mechanism and the value of the multi-level signal that are supplied from the gamepad;

(3) third program code for specifying the identification information of the representation corresponding to the detected identification information of the push operation mechanism and the detected value of the multi-level signal, and retrieving the image description data associated with the specified identification information of the representation from the memory region; and (4) fourth program code for creating an entertainment image on the predetermined display unit and changing the representation of the entertainment image in accordance with the retrieved image description data.

11. A computer program product, comprising a computer-readable medium containing program code for causing a computer connected to a predetermined display unit and a gamepad having two or more push operation mechanisms each of which is adapted to produce a multi-value signal representing each of three of more values that vary in relation to a pressure with which a corresponding push operation is pressed, the program code comprising:

(1) first program code for holding, in a predetermined memory region, image description data used to display different representations of a given entertainment image, the image description data being further associated with identification information of the representation, identification information of the push operation mechanism, and a value of the multi-level signal;

(2) second program code for detecting the identification information of the push operation mechanism and the value of the multi-level signal that are supplied for the gamepad;

(3) third program code for specifying the identification information of the representation corresponding to the detected identification information of the push operation mechanism and the detected value of the multi-level signal, and retrieving the image description associated with the specified identification information of the representation from the memory region; and (4) fourth program code for displaying an entertainment image on the predetermined display unit and changing the representation of the entertainment image on display in accordance with the retrieved image description data.

12. An entertainment device that creates an entertainment image on a predetermined display unit in response to a multi-level signal supplied from a gamepad associated therewith, the gamepad having two or more push operation mechanisms each of which is adapted to produce a multi-level signal representing each of three or more values that vary in relation to a pressure with which a corresponding push operation mechanism is pressed, said entertainment device comprising:

data holding means for holding image description data used to display first representations of a given entertainment image, each representation providing a different viewing perspective of the given entertainment image, the image description data for each representation being further associated with identification information of the representation, identification information of the push operation mechanism, and a value of the multi-level signal;

detection means for detecting the identification information of the push operation mechanism and the value of the multi-level signal that are supplied from the gamepad;

data retrieval means that specifies the identification information of the representation corresponding to the detected identification information of the push operation mechanism and the detected value of the multi-level signal, and retrieves the image description data associated with the specified identification information of the representation from said data holding means; and display control means that displays a representation of the entertainment image on the predetermined display unit that corresponds to the retrieved image description data.

13. The entertainment device as claimed in claim 12, wherein each representation provides a different subjective perspective view of a player character in relation to a portion of its surroundings.

14. The entertainment device as claimed in claim 12, wherein each representation provides an objective perspective view of a player character exhibiting a different subjective perspective view in relation to a portion of its surroundings.

15. The entertainment device as claimed in claim 12, wherein each representation provides an objective perspective view of a player character exhibiting a fixed subjective perspective view in relation to a portion of its surroundings.

16. The entertainment device as claimed in claim 12, wherein the data holding means holds image description data used to display second representations of a given entertainment image, the second representations being selected from the group consisting of displayed possessions of a player character, action patterns of the player character, an energy level or power of the player character, effects associate with objects possessed by the player character, and degrees of influence that can be exercised on the player character by a displayed object.

17. The entertainment device as claimed in claim 16, wherein the degree of influence limits movement of the player character with reference to an object.

* * * * *